US007190492B2

(12) United States Patent
Hakkaku

(10) Patent No.: US 7,190,492 B2
(45) Date of Patent: Mar. 13, 2007

(54) SERIAL RECORDING SYSTEM PRINTER AND CONTROL METHOD

(75) Inventor: Kunio Hakkaku, Tokyo (JP)

(73) Assignee: Fuji Photo Film Co. Ltd, Kanagawa (JP)

( * ) Notice: Subject to any disclaimer, the term of this patent is extended or adjusted under 35 U.S.C. 154(b) by 786 days.

(21) Appl. No.: 10/268,910

(22) Filed: Oct. 11, 2002

(65) Prior Publication Data

US 2003/0077100 A1 Apr. 24, 2003

(30) Foreign Application Priority Data

Oct. 11, 2001 (JP) ............................ 2001-313512

(51) Int. Cl.
*H04N 1/23* (2006.01)

(52) U.S. Cl. ........................ 358/304; 358/1.2; 358/1.3; 347/147; 83/29; 83/863; 83/864

(58) Field of Classification Search ............... 358/1.12, 358/1.3, 304; 83/29, 863, 864
See application file for complete search history.

(56) References Cited

U.S. PATENT DOCUMENTS 5,727,433 A * 3/1998 Pomerleau et al. ............ 83/29
6,072,596 A * 6/2000 Hattori et al. .............. 358/401
6,112,630 A * 9/2000 Miura ........................ 83/76.6
6,619,167 B2 * 9/2003 Mikkelsen et al. ............ 83/13
6,721,060 B1 * 4/2004 Kawamura et al. .......... 358/1.3

FOREIGN PATENT DOCUMENTS

JP 6-36798 U 5/1994
JP 2002-160409 A 6/2002

* cited by examiner

*Primary Examiner*—Twyler Lamb
*Assistant Examiner*—Robert N. Kang
(74) *Attorney, Agent, or Firm*—Sughrue Mion, PLLC

(57) ABSTRACT

A serial recording system printer continuously records a plurality of pages on a continuous recording sheet repeatedly fed/stopped and conveyed with a constant conveyance step width. A cutter is disposed on a downstream side of a print head so that the position of the cutter can be changed in the conveyance direction. The cutter position is moved for each page in accordance with the dimension of the page, and the sheet is cut. It is assumed that a signal indicating a terminal or front end position of the page is a start point, and that a product (nα) of a conveyance step width (α) and the number of repetitions (n) is set as a conveyance distance of the recording sheet. The cutter is moved to be positioned so that a distance (A) to the cutter from a print end position of a page terminal end or a print start position of a page front end agrees with the conveyance distance (nα).

17 Claims, 5 Drawing Sheets

SERIAL RECORDING SYSTEM PRINTER AND CONTROL METHOD

FIELD OF THE INVENTION

The present invention relates to a printer of a serial recording system which continuously records a plurality of pages on a continuous recording sheet repeatedly fed/stopped and conveyed with a constant conveyance step width, i.e., a constant feeding pitch and to a control method of the printer.

BACKGROUND OF THE INVENTION

In a printer of a serial recording system, a continuous sheet is repeatedly fed/stopped and conveyed with a predetermined dimension unit (conveyance step width). Moreover, a plurality of pages are continuously printed on the continuous sheet by a print head, and a joint between the pages is cut away with a cutter on a downstream side of the print head.

The cutter for use herein performs a cut operation while the continuous recording sheet stops. Since the position of the cutter is fixed, a cut position of the sheet is provided every conveyance step width.

Since the cut position of the sheet is discontinuously determined at an interval of the conveyance step width in this manner, it is impossible to cut the sheet within the conveyance step width. Therefore, when a cut dimension or size of the sheet does not accurately agree with a multiple of a conveyance step width (α), the cut sheet having such dimension cannot be obtained. The sheet must be cut before or after the desired dimension. Thus obtained cut sheets have different dimension. Thus obtained cut sheets have different dimension. That is, a dispersion is generated in the dimension of the cut sheet.

For example, it is assumed that the image is recorded by eight divisions (eight paths) in a sub scanning direction by an ink jet head including 512 nozzles at 400 dpi. In this case, the sheet is fed by a unit of (512/400)÷8 inches (=0.16 inch=4.064 mm=α). On the other hand, a boundary of page sometimes comes midway in the width (conveyance step width) α. In this case, to cut a correct page dimension, the sheet has to be cut midway in the width α. However, it has heretofore been impossible to cut the sheet in such a position.

Moreover, when a length of the image to be recorded on each page in the conveyance direction does not agree with a multiple of the conveyance step width (i.e., feeding pitch of the sheet), the position of the recording image in each page is displaced from the position of the recording image in the preceding and/or next page. Therefore, the length of the margin surrounding the recorded image varies in the contiguous pages. The marginal length disperses in each of pages.

The dispersion of the marginal dimension does not usually raise any problem in a printer having a large size such as an AO size. The difference of marginal dimension is not conspicuous. However, to print a small size such as an A4 size and picture size (a length especially of a sheet short side is 89 mm), the dispersion of the marginal dimension is recognized as a conspicuous error.

Further, by repeating displacement of the recorded image in the contiguous pages, the recorded image will intrudes into the next page. To obtaining a cut sheet containing the entire recorded image therein, the continuous recording sheet is further conveyed by one conveyance step width, i.e., is fed one more feeding pitch, before the sheet is cut by the cutter. The obtained cut sheet has a different and longer dimension than that of the ordinary cut sheet. This causes the dispersion in the cut dimension of the printed and cut sheets. Therefore, edges of bundled printed sheets are irregularly aligned.

It has been proposed that the reduction of a division width of a sub scanning direction in a last divided recording portion of the image in order to reduce the dispersion of the cut dimension of the sheet. However, in this case, since the division width of the sub scanning direction is small, that is, since the feeding pitch of the sheet is small, a streak (banding) is generated in a main scanning direction and an image quality is easily deteriorated. A problem occurs that a recording time (print time) lengthens.

There is another proposed method of moving a terminal end (cut position) of a recording page to a fixed position of a cutter blade and cutting the page, every time one sheet of image is recorded. However, in this case, a tip end of sheet has to be returned to the recording position of the print head before starting the recording of the next page. Therefore, a time required for the printing lengthens, additionally a conveyance mechanism of the sheets becomes complicated, and also the sheet is drawn/returned resulting in a drop of reliability of the operation.

SUMMARY OF THE INVENTION

The present invention has been accomplished in consideration of this situation, and a first object of the present invention is to provide a control method of a serial recording system printer, in which deterioration of an image quality or reduction of a print speed is not caused different from a method of reducing a conveyance step width of a sheet, the reduction of the print speed, complicated mechanism, or lowered reliability is not caused different from a method of reciprocating/moving the sheet for each page and returning the sheet to a print head, and a cut dimension of the sheet can be prevented from becoming irregular even in the serial recording system.

Moreover, a second object of the present invention is to provide a serial recording system printer for direct use in carrying out the method.

According to the present invention, the first object is attained by a provision of a control method of a serial recording system printer which continuously records a plurality of pages on a continuous recording sheet repeatedly fed/stopped and conveyed, the method comprising the steps of:

disposing a cutter on a downstream side of a print head for recording an image on the continuous recording sheet in a conveyance direction of the continuous recording sheet, a position of the cutter being able to be changed in the conveyance direction;

positioning the cutter so that the cutter is matched with the dimension of the page to be cut from the continuous recording sheet; and cutting the continuous recording sheet being stopped.

The cutter can be positioned as follows. That is, it is assumed that a signal indicating a terminal or front end position of the page (print end or start signal) is a start point, and that a product (nα) of a conveyance step width (α) and the number of repetitions (n) is set as a conveyance distance of the recording sheet. The cutter is positioned so that a distance (A) to the cutter from a print end position of a page terminal end or a print start position of a page front end (position on a conveyance path) agrees with the conveyance distance (nα).

The cutter may perform only one cutting in a cut position obtained in this manner, but may also perform two cuttings in the vicinity of the cut position via a boundary of the page. For example, to print an output without disposing any margin between contiguous pages, it is difficult to accurately match the cut position with the boundary of two pages. Therefore, in this case, opposite sides are cut with respect to the boundary.

According to the present invention, the second object is attained by a provision of a serial recording system printer which continuously records a plurality of pages on a continuous recording sheet repeatedly fed/stopped and conveyed, the printer comprising:

conveyance means for conveying the continuous recording sheet with a predetermined conveyance step width;

a print head for recording an image on the continuous recording sheet in a main scanning direction during the conveyance of continuous recording sheet is stopped;

a cutter disposed on a downstream side of the print head in a conveyance direction of the continuous recording sheet so that a position of the cutter in the conveyance direction can be changed; and cutter controller for positioning the cutter so that the cutter is matched with a dimension of each page, and cutting the continuous sheet being stopped.

The print head is not particularly limited as long as the image can be printed in the main scanning direction during the stopping of the sheet repeatedly fed/stopped and conveyed, and, for example, an ink jet system in which the head is reciprocated in the main scanning direction, a thermal transfer system, a thermal recording system, and the like are suitable.

At the start or end of the printing of one page on the continuous recording sheet with the print head, the conveyance distance of the recording sheet is monitored until the print start or end position of the page reaches the vicinity of the position of the cutter.

Subsequently, the print start/end position of the page reaches the vicinity of the cutter position, and the position of the cutter is then adjusted so that the cutter reaches the print start/end position. The adjustment of the cutter position may be performed beforehand, when the print start/end position is brought in the vicinity of the cutter position. Moreover, when the print start/end position of the page reaches the adjusted position of the cutter, the cutter is actuated to cut the sheet. In this cutting step, the sheet is stopped.

DESCRIPTION OF THE PREFERRED EMBODIMENTS

Figure 1:
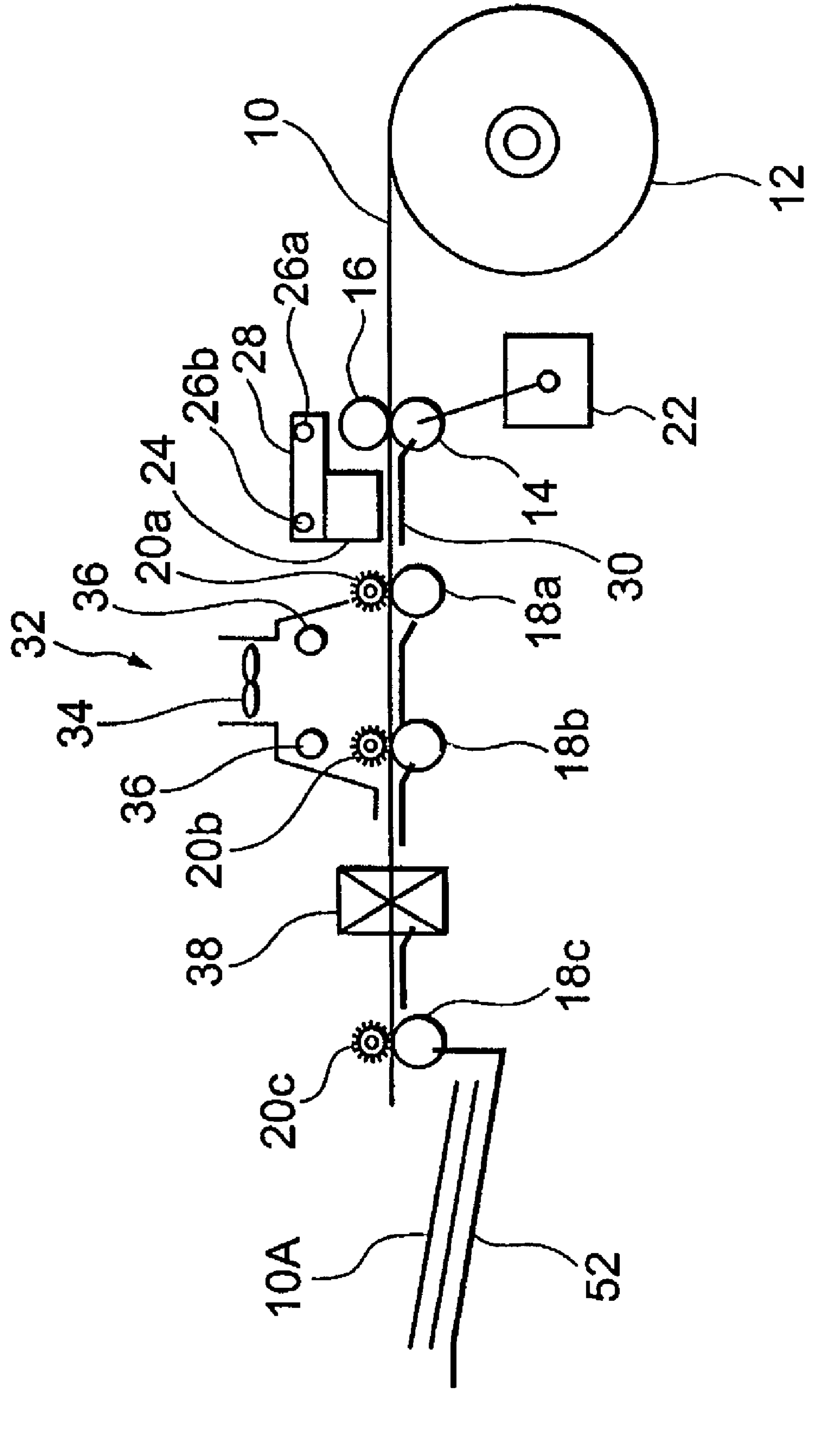
FIG. 1 is a schematic side view of one embodiment of the present invention.

In FIGS. 1–5, Reference numeral 10 denotes a continuous recording sheet as a material to be recorded, and the sheet 10 is supplied from a sheet roll 12 wound in a paper tube shape.

The recording sheet 10 includes an ink absorption layer on one surface of a base sheet. The recording sheet 10 and roll 12 have a width of 152 mm, for example, based on a print size of a photograph.

The recording sheet 10 is held between conveyance rollers 14 and 16 and between conveyance rollers 18 (18*a* to 18*c*) and needle wheels 20 (20*a* to 20*c*) and conveyed in a predetermined direction (left direction, sub scanning direction on FIGS. 1, 2) while the ink absorption layer faces upwards. Here, all or some of the conveyance rollers 14, 18 are driven by a conveyance motor 22. The needle wheel 20 has a large number of needles project from an outer peripheral surface, and prevents a recording surface from being disturbed with a non-dried ink applied by an ink jet head 24 described later.

The ink jet head 24 is disposed opposite to an upper surface of the recording sheet 10 between the conveyance roller 16 and needle wheel 20*a*. The head 24 is held by a carriage 28 which runs along two parallel guide shafts 26 (26*a*, 26*b*) disposed in a width direction (main scanning direction) of the recording sheet 10, and the head 24 can reciprocate together with the carriage 28.

Reference numeral 30 is a platen for supporting the lower surface of the recording sheet 10 between the conveyance rollers 14, 18*a*. The recording sheet 10 is brought in contact with the upper surface of the platen 30 and moved on the platen 30. An interval between the recording sheet 10 and head 24 is kept to be constant.

In FIG. 1, reference numeral 32 is drying means disposed above the needle wheels 20*a*, 20*b*. The drying means 32 heats air fed by a fan 34 with heaters 36, 36 such as an infrared lamp, and introduces warm air onto the upper surface of the recording sheet 10. By this warm air, the ink applied on the upper surface of the recording sheet 10 is dried.

Figure 2:
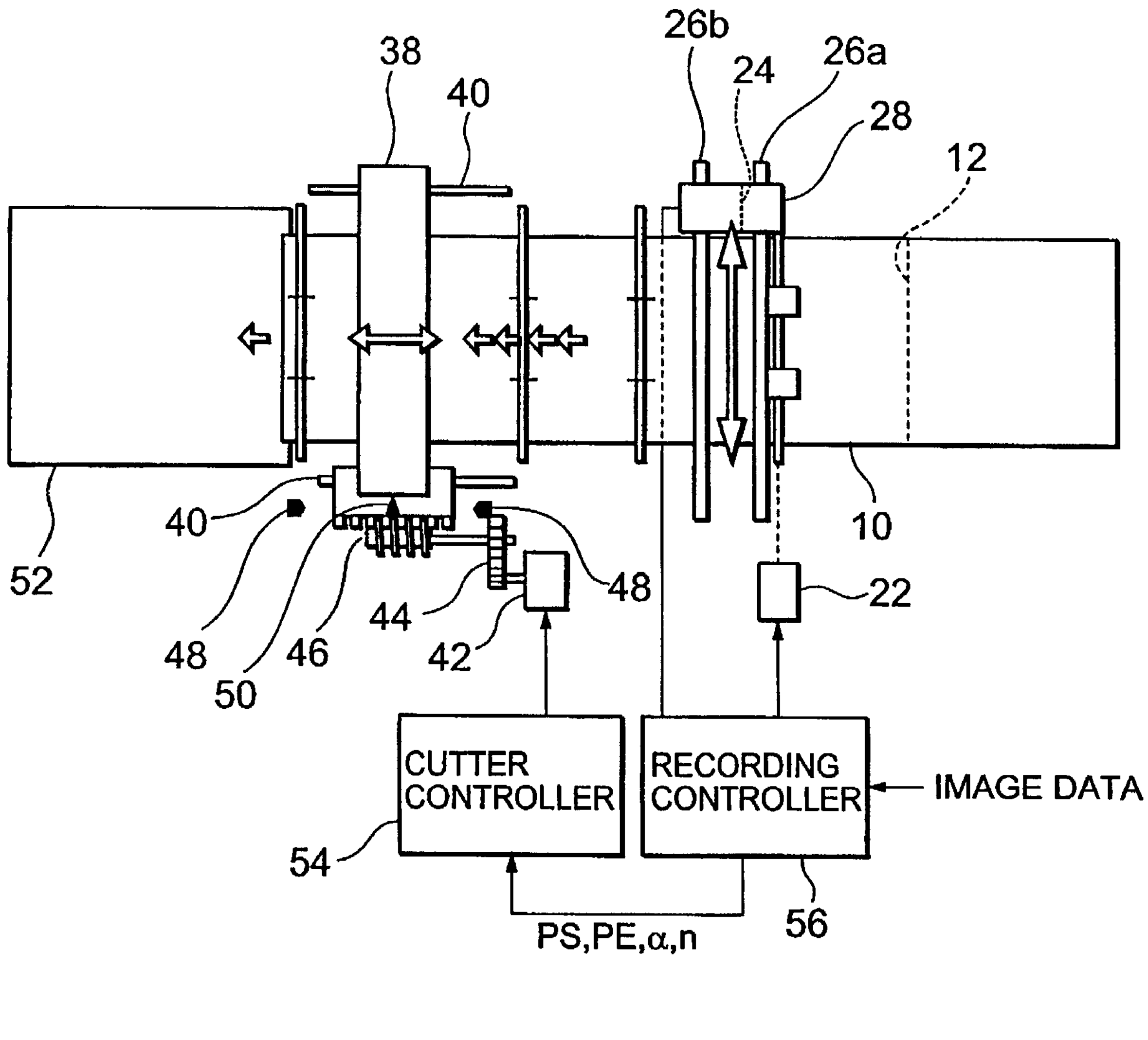
FIG. 2 is a plan view of the embodiment.

A cutter 38 is disposed on a downstream side of the drying means 32. As shown in FIG. 2, the cutter 38 can move in parallel with a conveyance direction of the recording sheet 10. More specifically, the cutter 38 is held by two guide shafts 40, 40 disposed in parallel with the conveyance direction on opposite sides of the width direction of the recording sheet 10 so that the cutter 38 can slide. The cutter 38 is positioned in the conveyance direction by a motor 42.

In details, the rotation of the motor 42 is converted to a linear movement along the conveyance direction by a reduction gear 44 and feed screw mechanism 46, and the cutter 38 moves in the conveyance direction by the linear movement to be positioned. Reference numerals 48, 48 are limit sensors for regulating a movement range of the cutter 38, and 50 is a home position sensor for setting a reference position of the cutter 38.

The continuous recording sheet 10 is cut in a predetermined dimension with the cutter 38, and a cut recording sheet 10A is collected onto a discharge tray 52. In FIG. 2, reference numeral 54 is cutter controller for determining the cut position of the cutter 38 to operate the cutter 38.

Reference numeral 56 is a recording controller which controls each part of the whole apparatus to record an image on the recording sheet 10, and sends a signal required for determining the cut position to the cutter controller 54. An operation will be described with reference to FIGS. 3–5.

When image data is first inputted, the recording controller 56 actuates the conveyance motor 22 to start conveying the recording sheet 10. In this case, a print start signal PS indicating a position of a front end $F_1$ of a first page where the printing is started by the ink jet head 24 is sent to the cutter controller 54 (step S100 of FIG. 4). A conveyance step width or feeding pitch ($\alpha$) by the conveyance motor 22, the number of repetitions (n) of a conveyance step, and the like are inputted into the cutter controller 54.

In an exemplary embodiment, the method obtains an integer number n =[A/$\alpha$], represented by Gauss'notation, which represents the largest integer not exceeding a number in the square brackets, wherein A is a distance to a current position of the cutter from a terminal end position of the page at the current time during the stopping of the recording sheet, and wherein a is the feeding pitch. Assuming a conveyance distance of the page terminal end position as na; the cutter is moved toward a print head side from the current position by $|A-\alpha n|$ to cut the sheet in the page terminal end position. Similar adjustments can be made on incremental changes in the number of incremental step (n+1), or positioning relative to a page front end.

On receiving the print start signal (PS) indicating the print start position, the cutter controller 54 accumulates the number of conveyance steps (n), and obtains a conveyance distance $x=n\alpha$ (step S102). Subsequently, it is monitored whether or not the print start position $F_1$ enters a movable range of the cutter 38. For example, assuming that a distance to a home position HP of the cutter 38 from the print start position (position on a conveyance path) is A, it is checked whether or not $x=n\alpha$ is in a range of ($A\pm\alpha$) (step S104). If $x=n\alpha$ does not reach in the range of $A\pm\alpha$, n is changed to n+1 (step S106), and then the checking step S104 is repeated.

The operation of the step S104 may be performed after the front end $F_1$ of the first page (FIG. 5) enters the movable range of the cutter 38, but is preferably performed in a precedent manner. That is, since the conveyance step width ($\alpha$) is constant, the number n of repetitions of the conveyance step for bringing the front end $F_1$ into the movement range of the cutter 38 may be estimated.

The number n is obtained in this manner before the front end F1 enters the movable range of the cutter 38 (step S106). At this time, the cutter controller 54 obtains a difference $\Delta$between a feed amount (conveyance distance) x =$\alpha$n and a distance A by $\Delta$=(A- $\alpha$n) (step S108). Subsequently, the cutter 38 is moved by the difference $\Delta$toward the upstream side (step S110). That is, the motor 42 is driven to move the cut position of the cutter 38 by $\Delta$. When the cutter 38 is operated in this position, and the recording sheet 10 is cut, the cut position corresponds to the front end F1 of the first page (step S112). It is to be noted that the cutter 38 cuts the recording sheet 10 during the recording on the recording sheet 10 by the head 24 and the stopping of the conveyance of the recording sheet 10. If the difference $\Delta$=(A- an) is a negative number, the cutter 38 is moved by positive number $|\Delta|=|A-\alpha n|$ represented by absolute number, toward the downstream side.

After completion of the printing of the page, a print end signal PE indicating a position of a terminal end $E_1$ of the first page is fed from the controller 56 to the cutter controller 54. Based on the signal PE, the operation of steps S100 to S112 is repeated. As a result, the terminal end $E_1$ of the first page is cut. Subsequently, terminal ends $E_2$, $E_3$, $E_n$ of each page are similarly cut. Here, the positions of the terminal ends $E_1$, $E_2$, $E_n$ are disposed midway in the print width of the print head 24 as described above.

Figure 3A:
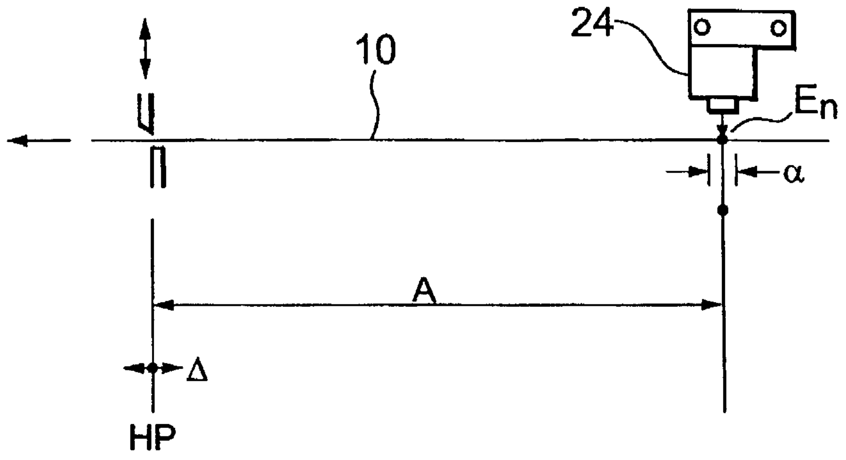
FIGS. 3A–3C are operation explanatory views of the embodiment.
Figure 3B:
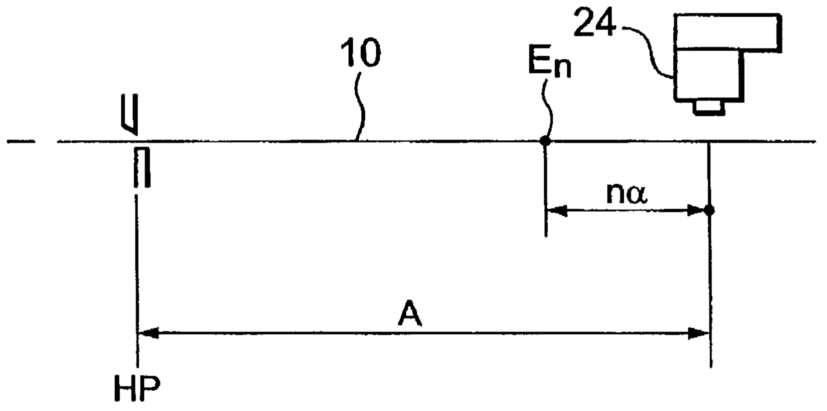
Figure 3C:
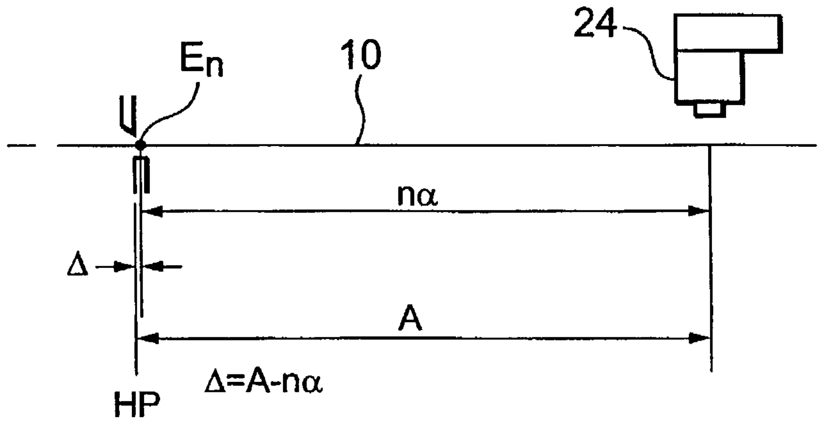
Figure 4:
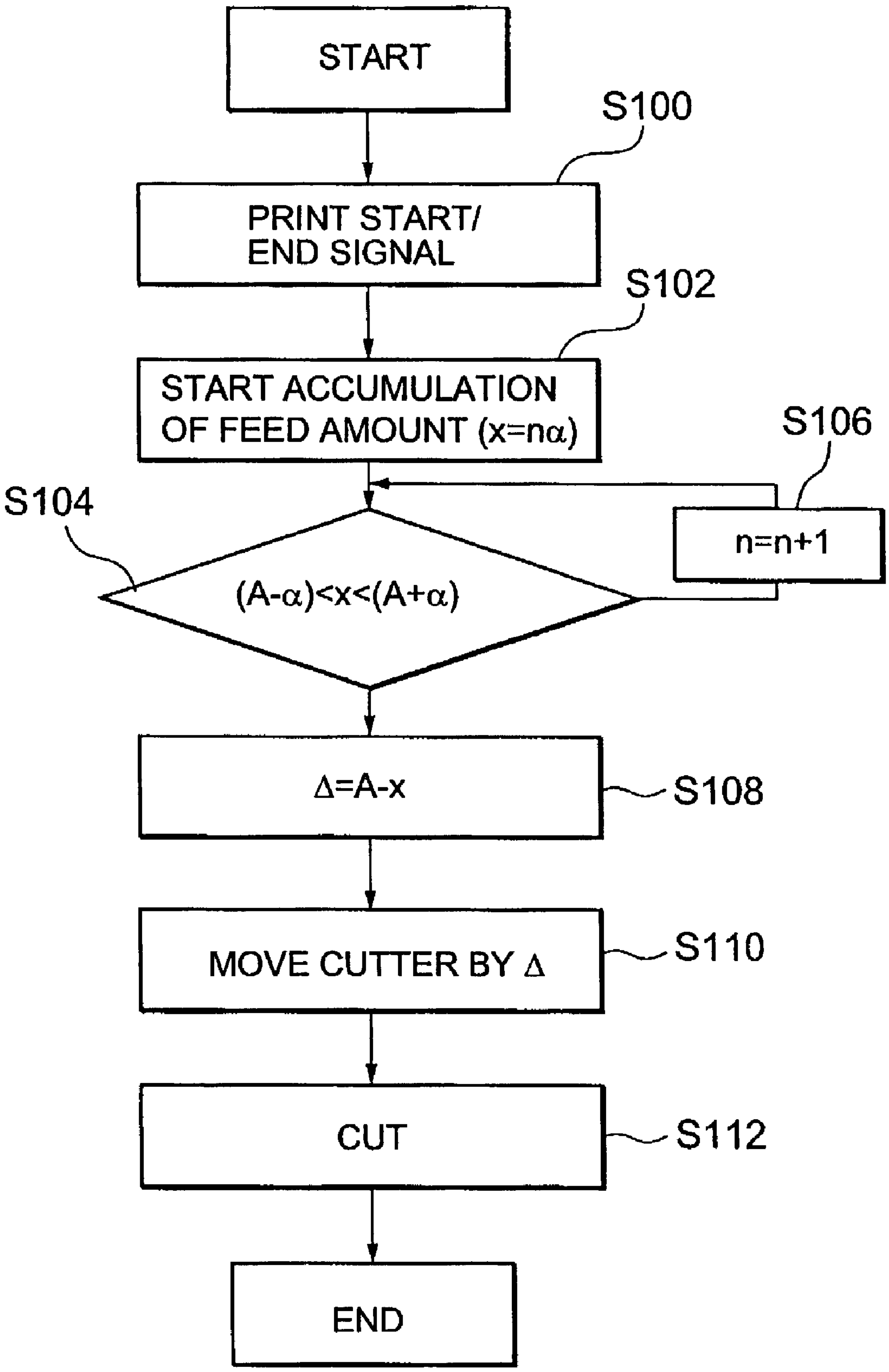
FIG. 4 is an operation flowchart of the embodiment.
Figure 5:
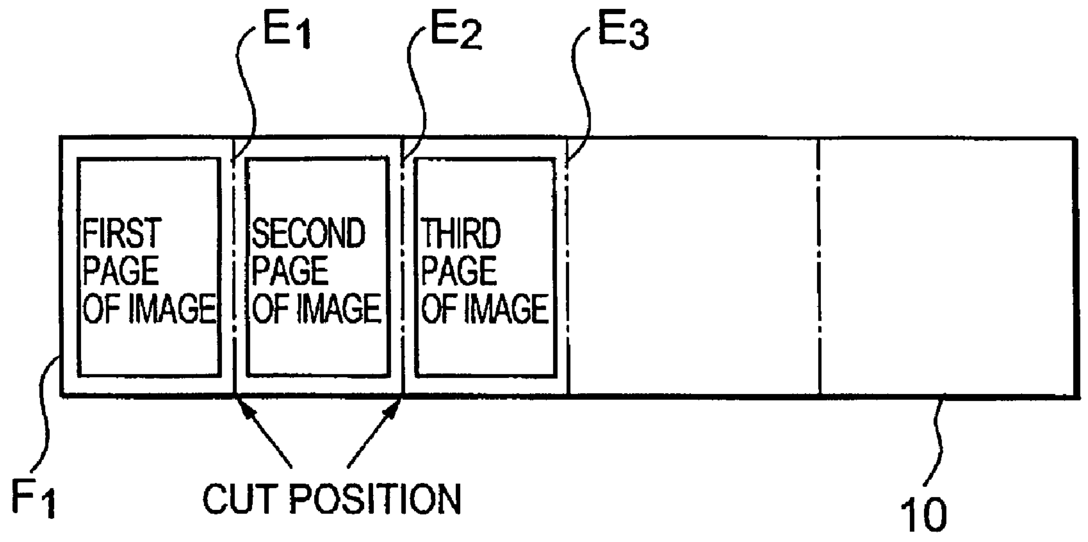
FIG. 5 is an explanatory view of a cut position.

FIG. 3 shows an operation in which terminal ends $E_n$ ($E_1$, $E_2$ . . . ) of the page are cut. In a position where the printing ends at the terminal end $E_n$ of the page by the head 24 (see FIG. 3A), the print end signal PE is outputted. From this time, the conveyance distance x of the terminal end $E_n$is obtained by $x=n\alpha$ (see FIG. 3B). Here, since the terminal end (print end position) $E_n$ changes with the page within the width of the conveyance step width $\alpha$, the position of the terminal end $E_n$ on the conveyance path changes with the page. After the distance x approaches a distance A to the home and current position HP of the cutter 38 from the print end position $E_n$ on the conveyance path in FIG. 3A, it is confirmed that a difference $\Delta=A-n\alpha$ is smaller than the movable range of the cutter 38, and the cutter 38 is moved by the difference $\Delta$ to cut the sheet (see FIG. 3C).

Figure 6:
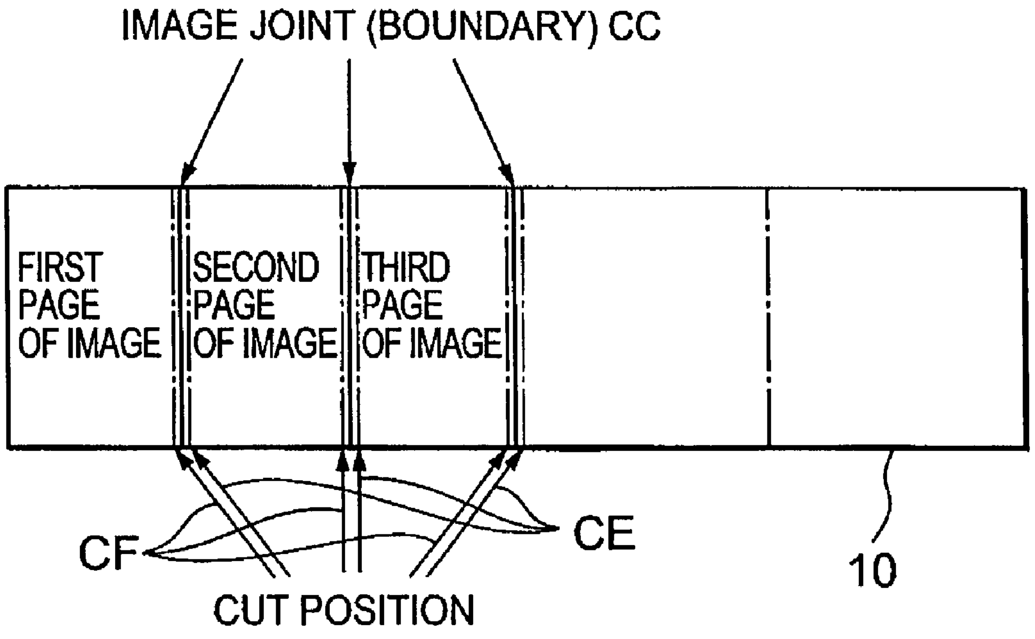
FIG. 6 is an explanatory view of the cut position in another embodiment.

FIG. 6 is an explanatory view of the cut positions according to another embodiment. In this embodiment, to continuously print the image without disposing any margin between the pages, two cuttings are performed via a boundary of the pages.

That is, to eliminate waste of the sheet, the continuous printing is sometimes performed without disposing any margin in the page. In this case, it is remarkably difficult to match the cut position with the boundary of the pages with a high precision. To solve the problem, in this case, the sheet is cut twice via the boundary, and a slit-shaped portion including the boundary is discarded.

To perform two cuttings in this manner, positions having constant dimensions before and after the cut position obtained according to the above-described embodiment as a basis may be cut. As shown in FIG. 6, boundaries CC as joints of the images of the pages are assumed to correspond to the cut positions $F_1$, $E_1$, $E_2$, . . . $E_n$ in the above-described embodiment, and positions CF, FE apart by the constant dimension before and after are assumed to be the cut positions.

In this case, an interval between the cut positions CF, CE can be set to an optional interval. The cutter 38 can move and cut the sheet 10 twice while the head 24 performs one main scanning. The sheet 10 may be cut twice in two different main scanning operations of the head 24. The cut position may correspond to the conveyance step width ($\alpha$) of the recording sheet 10 or a multiple of the width. In this case, while two positions CF, CE are cut, it is unnecessary to move the cutter 38, and a quick cut operation can be performed.

As described above, according to the present invention, the cutter is disposed so that the position of the cutter can be changed in the conveyance direction. Moreover, the cutter position is moved for each page in accordance with the dimension of the page, and the sheet is cut. Therefore, the cut dimension of each page can be prevented from becoming irregular. Different from a method of reducing the conveyance step width of the sheet with respect to a part of a recording area, the deterioration of an image quality and reduction of a print speed are not caused. Moreover, different from a method of reciprocating the sheet for each page to cut the sheet, the reduction of the print speed and complication of a mechanism are not caused.

To carry out the method, for example, the print end (start) signal indicating the position of the terminal end (or front end) of the page is assumed to be a start point, and the conveyance distance ($x=\alpha n$) is obtained by a product of the conveyance step width ($\alpha$) and the number (n) of repetitions of the step. The cutter can be constituted to be moved so that the distance (x) agrees with the distance (A) to the cut position from the print end (start) position on the conveyance path. The cutter cuts the sheet twice via the obtained cut position. Then, when the pages are continuously printed, a clean print can be obtained without any boundary between the pages.

According to another aspect of the present invention, there can be provided a serial recording system printer for direct use in carrying out the method.

What is claimed is:

1. A control method of a serial recording system printer which continuously records a plurality of pages on a continuous recording sheet repeatedly fed/stopped and conveyed, the method comprising the steps of:

disposing a cutter on a downstream side of a print head for recording an image on the continuous recording sheet in a conveyance direction of the continuous recording sheet, a position of the cutter being able to be changed in the conveyance direction;

assuming that a print end signal indicating a terminal end position of the page to be cut from the continuous recording sheet is a start point;

obtaining a conveyance distance (αn) by a product of a conveyance step width (α) and the number (n) of repetitions of the conveyance step;

changing the position of the cutter so that a distance (A) to a cut position of the cutter from a print end position of a terminal end of the page agrees with the conveyance distance (αn), thereby positioning the cutter so that the cutter is matched with the dimension of the page; and cutting the continuous recording sheet being stopped.

2. A control method of a serial recording system printer which continuously records a plurality of pages on a continuous recording sheet repeatedly fed/stopped and conveyed, the method comprising the steps of:

disposing a cutter on a downstream side of a print head for recording an image on the continuous recording sheet in a conveyance direction of the continuous recording sheet, a position of the cutter being able to be changed in the conveyance direction;

assuming that a print start signal indicating a front end position of the page to be cut from the continuous recording sheet is a start point;

obtaining a conveyance distance (αn) by a product of a conveyance step width (α) and the number (n) of repetitions of the conveyance step;

changing the position of the cutter so that a distance (A) to a cut position of the cutter from a print start position of a front end of the page agrees with the conveyance distance (αn), thereby positioning the cutter so that the cutter is matched with the dimension of the page; and cutting the continuous recording sheet being stopped.

3. A control method of a serial recording system printer which continuously records a plurality of pages on a continuous recording sheet repeatedly fed/stopped and conveyed, the method comprising the steps of:

disposing a cutter on a downstream side of a print head for recording an image on the continuous recording sheet in a conveyance direction of the continuous recording sheet, a position of the cutter being able to be changed in the conveyance direction;

positioning the cutter so that the cutter is matched with the dimension of the page to be cut from the continuous recording sheet; and cutting the continuous recording sheet being stopped;

cutting the continuous recording sheet twice via a boundary in the vicinity of an obtained boundary position between the pages by the cutter.

4. A serial recording system printer which continuously records a plurality of pages on a continuous recording sheet repeatedly fed/stopped and conveyed, the printer comprising:

conveyance means for conveying the continuous recording sheet with a predetermined conveyance step width;

a print head for recording an image on the continuous recording sheet in a main scanning direction during the conveyance of continuous recording sheet is stopped;

a cutter disposed on a downstream side of the print head in a conveyance direction of the continuous recording sheet so that a position of the cutter in the conveyance direction can be changed; and cutter controller for positioning the cutter so that the cutter is matched with a dimension of each page, and cutting the continuous sheet being stopped, wherein the cutter controller controls the position of the cutter so that a distance (nα) of the continuous sheet conveyed from a print end of a terminal end of the page agrees with a distance (A) to a cut position of the cutter from the print end position of the terminal end of the page.

5. The serial recording system printer according to claim 4, wherein the print head is an ink jet head which reciprocates in a direction perpendicular to the conveyance direction of the continuous recording sheet during the stopping of the continuous recording sheet to record the image.

6. A control method of a serial recording system printer which continuously records a plurality of pages on a continuous recording sheet, the method comprising the steps of:

providing a cutter on a downstream side of a print head;

conveying the continuous recording sheet by repeating feeding and stopping of the continuous recording sheet with a predetermined feeding pitch;

recording an image in a main scanning direction on the continuous recording sheet by the print head during stopping of the continuous recording sheet;

cutting the continuous recording sheet being stopped;

obtaining an integer number n=[A/α], represented by Gauss' notation, wherein A is a distance to a current position of the cutter from a terminal end position of the page at the current time during the stopping of the recording sheet, and wherein α is the feeding pitch;

assuming a conveyance distance of the page terminal end position as nα; moving the cutter toward a print head side from the current position by |A−nα| so that the cutter is aligned with the page terminal end position; and cutting the continuous recording sheet being stopped.

7. A control method of a serial recording system printer which continuously records a plurality of pages on a continuous recording sheet, the method comprising the steps of:

providing a cutter on a downstream side of a print head;

conveying the continuous recording sheet by repeating feeding and stopping of the continuous recording sheet with a predetermined feeding pitch;

recording an image in a main scanning direction on the continuous recording sheet by the print head during stopping of the continuous recording sheet;

obtaining an integer number n=[A/α], represented by Gauss' notation, wherein A is a distance to a current position of the cutter from a terminal end position of the page at the current time during the stopping of the recording sheet, and wherein α is the feeding pitch;

assuming a conveyance distance of the page terminal end position as (n+1)α, when the page terminal end position is conveyed by na and does not reach a movable range of the cutter;

moving the cutter toward a side opposite to a print head side from the current position by |A−(n+1)α| so that the cutter is aligned with the page terminal end position; and cutting the continuous recording sheet being stopped.

8. A control method of a serial recording system printer which continuously records a plurality of pages on a continuous recording sheet, the method comprising the steps of:

providing a cutter on a downstream side of a print head;

conveying the continuous recording sheet by repeating feeding and stopping of the continuous recording sheet with a predetermined feeding pitch;

recording an image in a main scanning direction on the continuous recording sheet by the print head during stopping of the continuous recording sheet;

obtaining an integer number n=[A/α], represented by Gauss' notation, wherein A is a distance to a current position of the cutter from a front end position of the page at the current time during the stopping of the recording sheet, and wherein α is the feeding pitch;

assuming a conveyance distance of the page front end position as nα;

moving the cutter toward a print head side from the current position by |A−nα| so that the cutter is aligned with the page front end position; and cutting the continuous recording sheet being stopped.

9. A control method of a serial recording system printer which continuously records a plurality of pages on a continuous recording sheet, the method comprising the steps of:

providing a cutter on a downstream side of a print head;

conveying the continuous recording sheet by repeating feeding and stopping of the continuous recording sheet with a predetermined feeding pitch;

recording an image in a main scanning direction on the continuous recording sheet by the print head during stopping of the continuous recording sheet;

obtaining an integer number n=[A/α], represented by Gauss' notation, wherein A is a distance to a current position of the cutter from a front end position of the page at the current time during the stopping of the recording sheet, and wherein α is the feeding pitch;

assuming a conveyance distance of the page front end position as (n+1)α, when the page front end position is conveyed by na and does not reach a movable range of the cutter;

moving the cutter toward a side opposite to a print head side from the current position by |A−(n+1)α| so that the cutter is aligned with the page front end position; and cutting the continuous recording sheet being stopped.

10. A control method of a serial recording system printer which continuously records a plurality of pages on a continuous recording sheet, the method comprising the steps of:

providing a cutter on a downstream side of a print head;

conveying the continuous recording sheet by repeating feeding and stopping of the continuous recording sheet with a predetermined feeding pitch;

recording an image in a main scanning direction on the continuous recording sheet by the print head during stopping of the continuous recording sheet;

positioning the cutter so that the cutter is aligned with a boundary of each page; and cutting the continuous recording sheet being stopped, further comprising the steps of:

cutting the continuous recording sheet twice via the boundary position of the page by the cutter.

11. A control method of a serial recording system printer which continuously records a plurality of pages on a continuous recording sheet, the method comprising the steps of:

providing a cutter on a downstream side of a print head;

conveying the continuous recording sheet by repeating feeding and stopping of the continuous recording sheet with a predetermined feeding pitch;

recording an image in a main scanning direction on the continuous recording sheet by the print head during stopping of the continuous recording sheet;

positioning the cutter so that the cutter is aligned with a boundary of each page; and cutting the continuous recording sheet being stopped, wherein a length of each page cut by the cutter is not an integer multiple of the feeding pitch.

12. A control method of a serial recording system printer which continuously records a plurality of pages on a continuous recording sheet, the method comprising the steps of:

providing a cutter on a downstream side of a print head;

conveying the continuous recording sheet by repeating feeding and stopping of the continuous recording sheet with a predetermined feeding pitch;

recording an image in a main scanning direction on the continuous recording sheet by the print head during stopping of the continuous recording sheet;

positioning the cutter so that the cutter is aligned with a boundary of each page; and cutting the continuous recording sheet being stopped, wherein a length of the image recorded in each page along the conveyance direction is not an integer multiple of the feeding pitch.

13. A serial recording system printer which continuously records a plurality of pages on a continuous recording sheet, the printer comprising:

conveyance means for conveying the continuous recording sheet by repeating feeding and stopping of the continuous recording sheet with a predetermined feeding pitch;

a print head which records an image in a main scanning direction on the continuous sheet during a conveyance of the continuous recording sheet is stopped;

a cutter for cutting the continuous recording sheet, the cutter being disposed on a downstream side of the print head in a conveyance direction of the continuous recording sheet so that a position of the cutter can be changed with respect to the conveyance direction; and cutter controller for positioning the cutter so that the cutter is aligned with a boundary of each page, and cutting the continuous recording sheet being stopped, wherein the cutter controller obtains an integer number n=[A/α], represented by Gauss' notation, wherein A is a current position of the cutter from a position of a page boundary line at the current time during the stopping of the recording sheet, and wherein α is the feeding pitch;

wherein a conveyance distance of the page boundary line is assumed as nα; and wherein the cutter is moved toward a print head side from the current position by |A−nα| to cut the recording sheet at the page boundary line.

14. A serial recording system printer which continuously records a plurality of pages on a continuous recording sheet, the printer comprising:

conveyance means for conveying the continuous recording sheet by repeating feeding and stopping of the continuous recording sheet with a predetermined feeding pitch;

a print head which records an image in a main scanning direction on the continuous sheet during a conveyance of the continuous recording sheet is stopped;

a cutter for cutting the continuous recording sheet, the cutter being disposed on a downstream side of the print head in a conveyance direction of the continuous recording sheet so that a position of the cutter can be changed with respect to the conveyance direction; and cutter controller for positioning the cutter so that the cutter is aligned with a boundary of each page, and cutting the continuous recording sheet being stopped, wherein the cutter controller obtains an integer number n=[A/α], represented by Gauss' notation, wherein A is a current position of the cutter from a position of a page boundary line at the current time during the stopping of the recording sheet, and wherein α is the feeding pitch;

wherein a conveyance distance of the page boundary line is assumed as (n+1)α, when the page boundary line is conveyed by nαand does not reach a movable range of the cutter; and wherein the cutter is moved toward a side opposite to a print head side from the current position by |A−nα| to cut the recording sheet at the page boundary line.

15. A serial recording system printer which continuously records a plurality of pages on a continuous recording sheet, the printer comprising:

conveyance means for conveying the continuous recording sheet by repeating feeding and stopping of the continuous recording sheet with a predetermined feeding pitch;

a print head which records an image in a main scanning direction on the continuous sheet during a conveyance of the continuous recording sheet is stopped;

a cutter for cutting the continuous recording sheet, the cutter being disposed on a downstream side of the print head in a conveyance direction of the continuous recording sheet so that a position of the cutter can be changed with respect to the conveyance direction; and cutter controller for positioning the cutter so that the cutter is aligned with a boundary of each page, and cutting the continuous recording sheet being stopped, wherein a length of each page cut by the cutter is not an integer multiple of the feeding pitch.

16. A serial recording system printer which continuously records a plurality of pages on a continuous recording sheet, the printer comprising:

conveyance means for conveying the continuous recording sheet by repeating feeding and stopping of the continuous recording sheet with a predetermined feeding pitch;

a print head which records an image in a main scanning direction on the continuous sheet during a conveyance of the continuous recording sheet is stopped;

a cutter for cutting the continuous recording sheet, the cutter being disposed on a downstream side of the print head in a conveyance direction of the continuous recording sheet so that a position of the cutter can be changed with respect to the conveyance direction; and cutter controller for positioning the cutter so that the cutter is aligned with a boundary of each page, and cutting the continuous recording sheet being stopped, wherein a length of the image recorded in each page along the conveyance direction is not an integer multiple of the feeding pitch.

17. The printer according to claim 13, wherein the print head is an ink jet head which reciprocates in a direction perpendicular to the conveyance direction of the continuous recording sheet during the stopping of the continuous recording sheet to record the image.

* * * * *